United States Patent
Irie (10) Patent No.: US 9,794,473 B2
(45) Date of Patent: Oct. 17, 2017

(54) IMAGING DEVICE, IMAGING DEVICE BODY, AND LENS BARREL

(71) Applicant: FUJIFILM Corporation, Tokyo (JP)

(72) Inventor: Kousuke Irie, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 15/441,263

(22) Filed: Feb. 24, 2017

(65) Prior Publication Data

US 2017/0171460 A1 Jun. 15, 2017

Related U.S. Application Data

(63) Continuation of application No. PCT/JP2015/074046, filed on Aug. 26, 2015.

(30) Foreign Application Priority Data

Sep. 11, 2014 (JP) .................................. 2014-184851

(51) Int. Cl.
   *H04N 5/225* (2006.01)
   *H04N 5/232* (2006.01)
   (Continued)

(52) U.S. Cl.
   CPC ........... *H04N 5/23212* (2013.01); *G02B 7/28* (2013.01); *H04N 5/2254* (2013.01); *H04N 5/238* (2013.01);
   (Continued)

(58) Field of Classification Search
   None
   See application file for complete search history.

(56) References Cited

U.S. PATENT DOCUMENTS 5,999,752 A * 12/1999 Ueyama ................. G03B 7/097
                                                    396/170
7,099,555 B2   8/2006 Onuki et al.
(Continued)

FOREIGN PATENT DOCUMENTS

JP   H10268382    10/1998
JP   2005062732    3/2005
(Continued)

OTHER PUBLICATIONS

"Written Opinion of the International Searching Authority of PCT/JP2015/074046", mailed on Nov. 24, 2015, with English translation thereof, pp. 1-7.

*Primary Examiner* — Twyler Haskins
*Assistant Examiner* — Wesley Chiu
(74) *Attorney, Agent, or Firm* — JCIPRNET (57) ABSTRACT

A distance-information acquisition unit acquires information about a distance to a subject in each focus detection region by setting a plurality of focus detection regions in an imaging region. A depth-of-field calculating unit calculates the depth of field for one major subject (principal object) on the basis of the information about a distance to the major subject, which is selected from a plurality of subjects, and a diaphragm value, which is corrected on the basis of optical characteristics of an APD filter. An insertion/retreat control unit determines whether or not a subject other than the major subject is present outside the depth of field on the basis of the information about the distance and inserts the APD filter onto the light path in a case in which the subject other than the major subject is present outside the depth of field.

9 Claims, 6 Drawing Sheets

(51) Int. Cl.
 *G02B 7/28* (2006.01)
 *H04N 5/235* (2006.01)
 *H04N 5/238* (2006.01)

(52) U.S. Cl.
 CPC ....... *H04N 5/2353* (2013.01); *H04N 5/23293* (2013.01)

(56) References Cited

U.S. PATENT DOCUMENTS

| | | | | |
|---|---|---|---|---|
| 2005/0041949 | A1* | 2/2005 | Onuki | G02B 27/58 385/140 |
| 2015/0062413 | A1* | 3/2015 | Yokoya | H04N 5/2354 348/363 |
| 2015/0362819 | A1* | 12/2015 | Bjornard | G02F 1/163 359/275 |
| 2017/0126948 | A1* | 5/2017 | Uchida | H04N 5/2351 |
| 2017/0126957 | A1* | 5/2017 | Uchida | H04N 5/23212 |
| 2017/0126958 | A1* | 5/2017 | Uchida | H04N 5/23293 |

FOREIGN PATENT DOCUMENTS

| | | |
|---|---|---|
| JP | 2005208526 | 8/2005 |
| JP | 2007-124279 | 5/2007 |
| JP | 2011221120 | 11/2011 |
| JP | 2011248161 | 12/2011 |
| JP | 2013183344 | 9/2013 |

\* cited by examiner

IMAGING DEVICE, IMAGING DEVICE BODY, AND LENS BARREL

CROSS-REFERENCE TO RELATED APPLICATION

This application is a Continuation of PCT International Application PCT/JP2015/074046 filed on 26 Aug. 2015, which claims priority under 35 USC 119(a) from Japanese Patent Application No. 2014-184851 filed on 11 Sep. 2014. The above application is hereby expressly incorporated by reference, in its entirety, into the present application.

BACKGROUND OF THE INVENTION

1. Field of the Invention

The present invention relates to an imaging device, an imaging device body, and a lens barrel that include an apodization filter.

2. Description of the Related Art

There is known an imaging device that includes an apodization filter (hereinafter, referred to as an APD filter) having optical characteristics in which light transmittance is reduced as a distance from an optical axis is increased (see JP2005-062733A). The APD filter reduces the amount of light around only a blurred image (spotlight blurring or the like), which is out of focus, without reducing the amount of light around an image plane. Accordingly, the APD filter realizes a beautiful blur by applying gradation to the profile of a blurred image. In JP2005-062733A, the APD filter can be inserted/retreated onto/from the optical axis and the insertion/retreat of the APD filter is performed in accordance with an imaging mode.

Further, an imaging device, which blurs the background by image processing, is known among imaging devices, such as a digital camera that has a short actual focal distance and cannot optically blur the background of a major subject or principal object (see JP2007-124279A). Specifically, in JP2007-124279A, information about distances to a plurality of subjects of an imaging region is acquired during an auto-focusing operation and blurring is electronically applied to subjects other than a major subject in accordance with the distances.

However, the APD filter makes the profile of an optically blurred image be smooth by reducing light. Accordingly, in the event that the APD filter is inserted onto the optical axis in accordance with an imaging mode as disclosed in JP2005-062733A, light is reduced by the APD filter even though a blurred image is not present in the background and the foreground. For this reason, there is a problem in that the brightness of a photographed image is wastefully reduced. Accordingly, it is desired that the APD filter is inserted only in a case in which a blurred image is present.

Since the imaging device disclosed in JP2007-124279A premises an optical system in which an optically blurred image is not generated, the imaging device cannot determine whether or not an optically blurred image is generated.

SUMMARY OF THE INVENTION

An object of the invention is to provide an imaging device, an imaging device body, and a lens barrel that allow an APD filter to be inserted under only an appropriate condition.

An imaging device of the invention comprises an imaging element, a focus lens, a diaphragm, an apodization filter, a distance-information acquisition unit, a depth-of-field calculating unit, and an insertion/retreat control unit. The imaging element photoelectrically converts an incident ray emitted from an imaging region and outputs an imaging signal. The focus lens is provided so as to be movable along a light path of the incident ray. The diaphragm is provided on the light path. The apodization filter is inserted/retreated onto/from the light path. The distance-information acquisition unit acquires information about a distance to a subject in each focus detection region by setting a plurality of focus detection regions in the imaging region in a state in which the apodization filter is retreated from the light path and performing focus detection on the basis of the imaging signal while moving the focus lens. The depth-of-field calculating unit calculates the depth of field for one major subject on the basis of the information about a distance to the major subject, which is selected from the plurality of subjects, and a diaphragm value of the diaphragm that is corrected on the basis of optical characteristics of the apodization filter. The insertion/retreat control unit determines whether or not a subject other than the major subject is present outside the depth of field on the basis of the information about the distance and inserts the apodization filter onto the light path in a case in which the subject other than the major subject is present outside the depth of field.

The depth-of-field calculating unit calculates the depth of field on the basis of the information about the distance to the major subject, the corrected diaphragm value, the focal distance of the focus lens, and the diameter of permissible circle of confusion determined depending on characteristics of the imaging element.

It is preferable that the imaging device comprises a region selection unit selecting one from the plurality of focus detection regions. It is preferable that a subject, which is present in the focus detection region selected by the region selection unit, is selected as the major subject.

It is preferable that the focus detection is performed by moving the focus lens at each search interval determined on the basis of the depth of focus depending on the diaphragm value not yet corrected and calculating a focusing evaluation value for each search interval on the basis of the imaging signal to detect a focus position.

The depth of focus depends on the diaphragm value, which is not yet corrected, and the diameter of permissible circle of confusion that is determined depending on the characteristics of the imaging element.

It is preferable that the search interval is determined on the basis of a condition in which the moving distance of an image plane depending on the movement of the focus lens corresponds to the depth of focus.

It is preferable that the imaging device further comprises: a photometric unit that acquires a photometric value by performing photometry on the basis of the imaging signal; and an imaging exposure determining unit that determines an imaging shutter speed from an exposure value calculated on the basis of the photometric value and the diaphragm value.

An imaging device body of the invention comprises a lens barrel mounting portion, an imaging element, a distance-information acquisition unit, a depth-of-field calculating unit, and an insertion/retreat control unit. A lens barrel is detachably mounted on the lens barrel mounting portion. The lens barrel includes a focus lens and a diaphragm that are disposed on a light path and an apodization filter that is to be inserted/retreated onto/from the light path. An imaging element photoelectrically converts an incident ray emitted from an imaging region of the lens barrel and outputs an imaging signal. The distance-information acquisition unit acquires information about a distance to a subject in each focus detection region by setting a plurality of focus detection regions in the imaging region in a state in which the apodization filter is retreated from the light path and performing focus detection on the basis of the imaging signal while moving the focus lens. The depth-of-field calculating unit calculates the depth of field for one major subject on the basis of the information about a distance to the major subject, which is selected from the plurality of subjects, and a diaphragm value of the diaphragm that is corrected on the basis of optical characteristics of the apodization filter. The insertion/retreat control unit determines whether or not a subject other than the major subject is present outside the depth of field on the basis of the information about the distance and inserts the apodization filter onto the light path in a case in which the subject other than the major subject is present outside the depth of field.

A lens barrel of the invention is detachably mounted on the imaging device body. The lens barrel comprises a focus lens, a diaphragm, an apodization filter, and a base end portion. The focus lens is provided so as to be movable along a light path of the incident ray. The diaphragm is provided on the light path. The apodization filter is inserted/retreated onto/from the light path. The base end portion is detachably mounted on the imaging device body.

According to the invention, since determines whether or not a subject other than a major subject is present outside the depth of field on the basis of information about a distance to a subject and an apodization filter is inserted onto a light path in a case in which the subject other than the major subject is present outside the depth of field, the APD filter can be inserted under only an appropriate condition.

DESCRIPTION OF THE PREFERRED EMBODIMENTS

Figure 1:
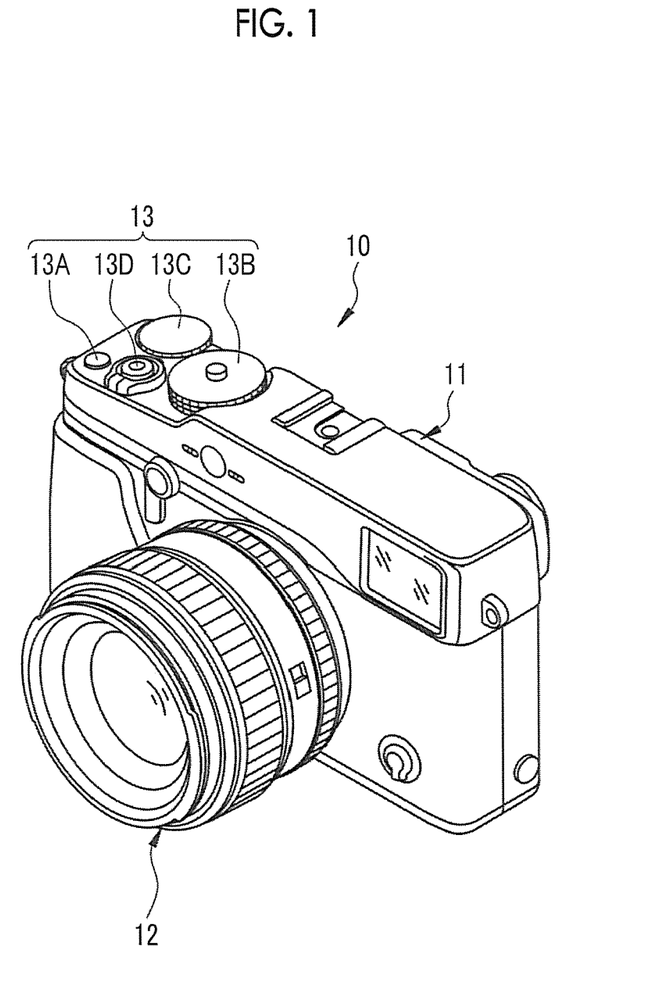
FIG. 1 is a perspective view of the appearance of an imaging device.

An imaging device 10 is a lens-interchangeable imaging device. In FIG. 1, the imaging device 10 includes an imaging device body 11 and a lens barrel 12. The imaging device body 11 is provided with an operation unit 13 that includes a power button 13A, a mode switching dial 13B, a setting dial 13C, a shutter button 13D, and the like.

The power button 13A is operated to turn on/off a power supply. The mode switching dial 13B is operated to switch an operation mode, such as an imaging mode. The setting dial 13C is operated to perform various kinds of setting. The shutter button 13D is operated to perform imaging. Specifically, auto-focus (AF) control and automatic exposure (AE) control are performed in a case in which the shutter button 13D is half pressed. In the event that the shutter button 13D is fully pressed, imaging is performed.

In addition, the operation unit 13 includes a touch sensor provided in a display unit, a selection button, a determination button (which are not shown), and the like. An AF area and an AE area can be set from an imaging region by the operation unit 13.

Figure 2:
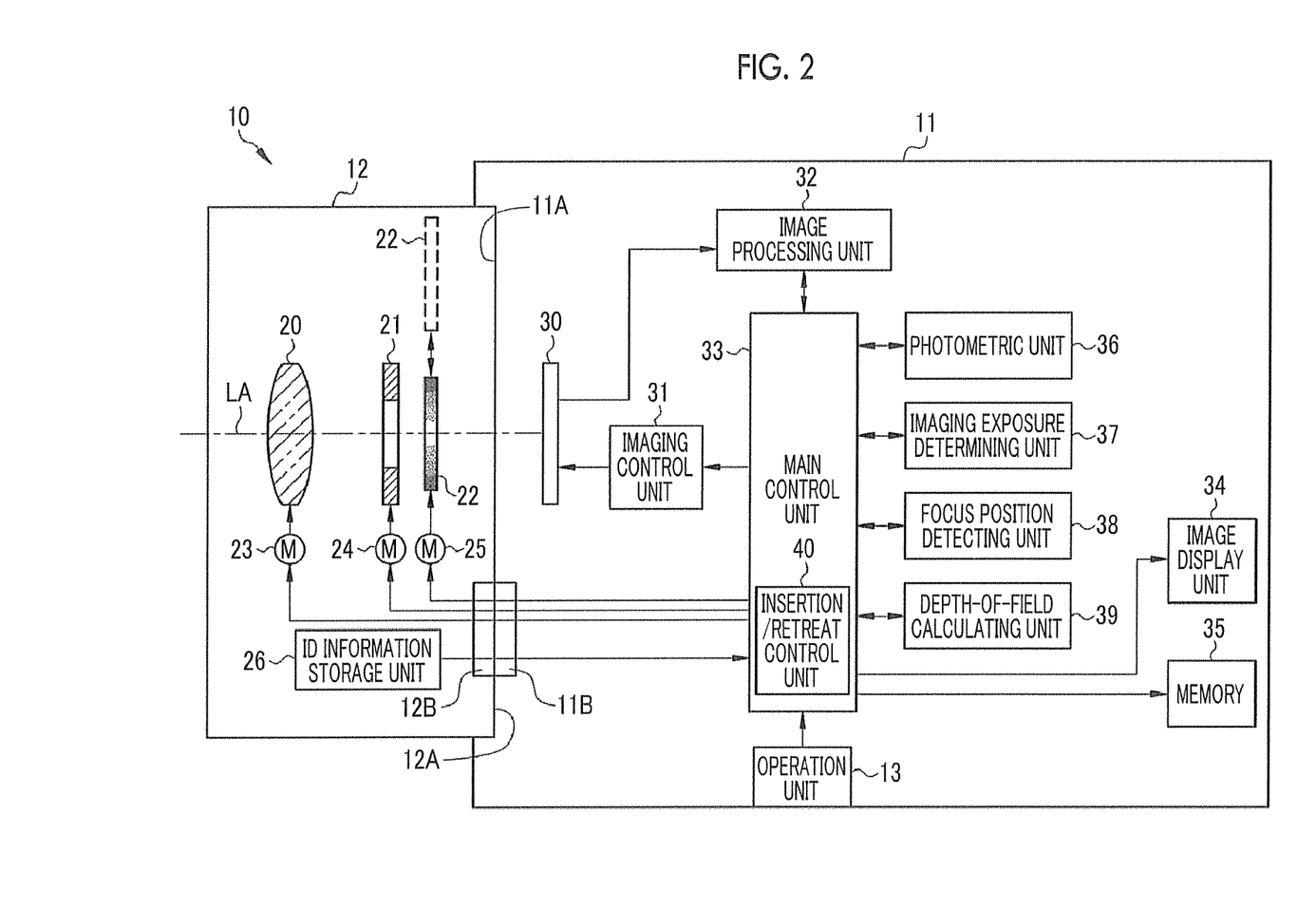
FIG. 2 is a block diagram showing the configuration of the imaging device.

In FIG. 2, the imaging device body 11 is provided with a lens barrel mounting portion 11A. In the event that a base end portion 12A of the lens barrel 12 is mounted on the lens barrel mounting portion 11A, the imaging device body 11 and the lens barrel 12 are connected to each other. The lens barrel mounting portion 11A and the base end portion 12A are provided with electrical contacts 11B and 12B, respectively. The imaging device body 11 and the lens barrel 12 are electrically connected to each other through the electrical contacts 11B and 12B.

The lens barrel 12 is detachably mounted on the imaging device body 11. The lens barrel 12 includes a focus lens 20, a diaphragm 21, an apodization (APD) filter 22, first to third motors 23 to 25, and an ID (identification) information storage unit 26. The focus lens 20, the diaphragm 21, and the APD filter 22 are disposed on an optical axis LA in this order toward the base end portion 12A from a subject. Subject light is incident along an optical axis LA as a light path.

The focus lens 20 is provided so as to be movable along the optical axis LA, and is driven by the first motor 23. The diaphragm 21 is to adjust the amount of incident rays by changing an effective aperture diameter, and the effective aperture diameter of the diaphragm 21 is changed by the second motor 24.

Figure 3:
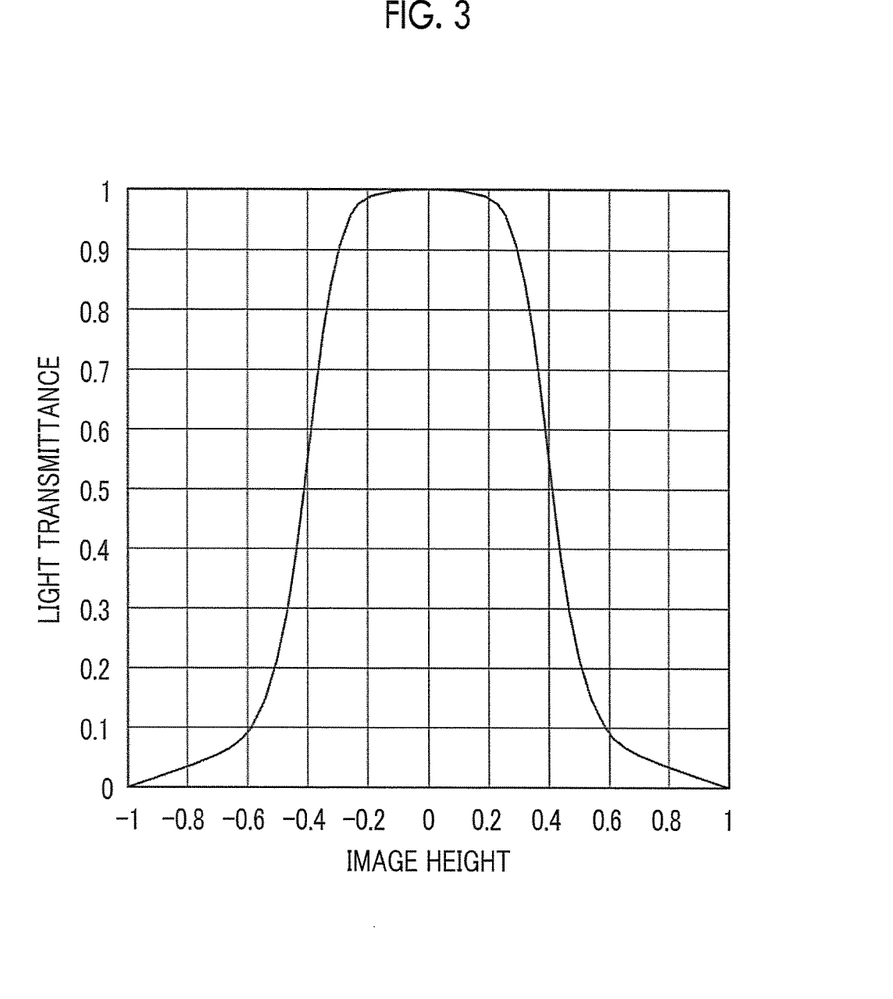
FIG. 3 is a graph showing the light transmittance characteristics of an APD filter.

The APD filter 22 is a kind of neutral density filter, and has optical characteristics shown in, for example, FIG. 3. The light transmittance of the neutral density filter is reduced as a distance from the center through which the optical axis LA passes (image height) is increased. For this reason, as the diaphragm value (F number) of the diaphragm 21 approaches an open value, a light-reducing effect of the APD filter 22 is increased. The F number is a value that is determined depending on the effective aperture diameter of the diaphragm 21, and light transmittance in an effective aperture region is not considered for the F number. The T number is a substantial diaphragm value that is obtained in consideration of light transmittance P in the effective aperture region, and is generally expressed by Equation (1).

$$T = \frac{F}{\sqrt{P}} \qquad \text{[Equation 1]}$$

In the event that the light transmittance of the APD filter 22 is applied as the light transmittance P, a T number, which is to be obtained in consideration of the optical characteristics of the APD filter 22, is obtained. A relationship between the T number and the F number is represented by a curve (correction curve) shown in FIG. 4. The F number is corrected to the T number by using the correction curve. As the T number approaches an open value, the amount of correction is increased.

The APD filter 22 is provided so as to be movable in a direction perpendicular to the optical axis LA. The APD filter 22 is driven by the third motor 25. Specifically, the third motor 25 moves the APD filter 22 between a first position where the center of the APD filter 22 corresponds to the optical axis LA and light emitted from the diaphragm 21 is incident on the APD filter 22 and a second position where the APD filter 22 is retreated from the optical axis LA and light emitted from the diaphragm 21 is not incident on the APD filter 22.

The ID information storage unit 26 stores ID information that is used to specify the type of the lens barrel 12. The ID information is information that is used to specify the focal distance f and the image plane movement coefficient k of the focus lens 20 of the lens barrel 12 and the optical characteristics of the APD filter 22. The image plane movement coefficient k is a ratio (moving magnification) of the moving distance of an image plane to the moving distance of the focus lens 20. The ID information, which is stored in the ID information storage unit 26, is sent to the imaging device body 11 through the electrical contacts 12B and 11B.

The imaging device body 11 includes an imaging element 30, an imaging control unit 31, an image processing unit 32, a main control unit 33, an image display unit 34, a memory 35, a photometric unit 36, an imaging exposure determining unit 37, a focus position detecting unit 38, and a depth-of-field calculating unit 39.

The imaging element 30 photoelectrically converts incident rays entering from an imaging region (the angle of view) through the lens barrel 12, and outputs imaging signals to the image processing unit 32. The imaging element 30 is a CMOS (Complementary Metal Oxide Semiconductor) image sensor or a CCD (Charge Coupled Device) image sensor, and can control an electronic shutter speed.

The imaging control unit 31 generates driving signals, which are used to drive the imaging element 30, on the basis of the control of the main control unit 33, and inputs the driving signals to the imaging element 30. The image processing unit 32 generates a photographed image by performing synchronization processing, gain correction processing, Y/C conversion, or the like on the imaging signals that are input from the imaging element 30.

The main control unit 33 controls each part, which is provided in the imaging control unit 31, and the first to third motors 23 to 25, which are provided in the lens barrel 12, on the basis of an operation signal that is input from the operation unit 13. Further, the main control unit 33 receives ID information from the ID information storage unit 26 that is provided in the lens barrel 12.

The image display unit 34 displays the photographed image and displays various kinds of information, such as an operation menu. The memory 35 stores the photographed image.

The photometric unit 36 calculates a photometric value (performs photometry) on the basis of a brightness signal that is obtained from the Y/C conversion or the like performed by the image processing unit 32. The photometric unit 36 supplies the calculated photometric value (subject brightness) to the imaging exposure determining unit 37. The calculation of the photometric value is performed in the AE area that is set in the imaging region of the imaging element 30. The imaging exposure determining unit 37 calculates an appropriate exposure value by performing predetermined calculation on the basis of the photometric value that is supplied from the photometric unit 36.

The imaging exposure determining unit 37 determines the calculated exposure value and an imaging exposure (an imaging diaphragm value and an imaging shutter speed) on the basis of a program diagram. The main control unit 33 sets the electronic shutter speed of the imaging element 30 on an imaging shutter by controlling the imaging control unit 31 on the basis of the imaging exposure that is determined by the imaging exposure determining unit 37, and sets the diaphragm value of the diaphragm 21 to an imaging diaphragm value by controlling the second motor 24.

While moving the focus lens 20 to a plurality of focusing evaluation positions along the optical axis LA through the main control unit 33, the focus position detecting unit 38 acquires focusing evaluation values by extracting high-frequency components from imaging signals, which are acquired at the respective focusing evaluation positions by the imaging element 30, and integrating the high-frequency components. The focus position detecting unit 38 specifies a focusing evaluation position, at which the focusing evaluation value is largest, as a focus position. That is, the focus position detecting unit 38 performs focus detection by a contrast AF method. The focus detection is performed in the AF area that is set in the imaging region of the imaging element 30.

The focus position detecting unit 38 determines an interval (search interval) $S_D$ between the focusing evaluation positions on the basis of the depth D of focus and an image plane movement coefficient k by using Equation (2).

$$S_D = \frac{nD}{k} \qquad \text{[Equation 2]}$$

Here, n is set to a constant that is equal to or larger than 1. In a case in which "n=1" is satisfied, long time is required for the detection of a focus position since a focus position is most accurately detected but the search interval $S_D$ is short. For this reason, it is preferable that, for example, "n=5" is satisfied. It is preferable that interpolation calculation is performed on the basis of a plurality of obtained focusing evaluation values in a case in which n is set to a value larger than 1 as described above. In this case, a focusing evaluation value of a focusing evaluation position in a case in which "n=1" is satisfied may be calculated and a focusing evaluation position, at which the focusing evaluation value is largest, may be specified as a focus position.

Further, the focus position detecting unit 38 calculates the depth D of focus on the basis of Equation (3). Here, δ denotes the diameter of permissible circle of confusion (see FIG. 6) that is determined depending on the characteristics of the imaging element 30. F denotes an F number that represents the diaphragm value that is not yet corrected.

$$D=2F\delta \qquad \text{[Equation 3]}$$

Figure 5:
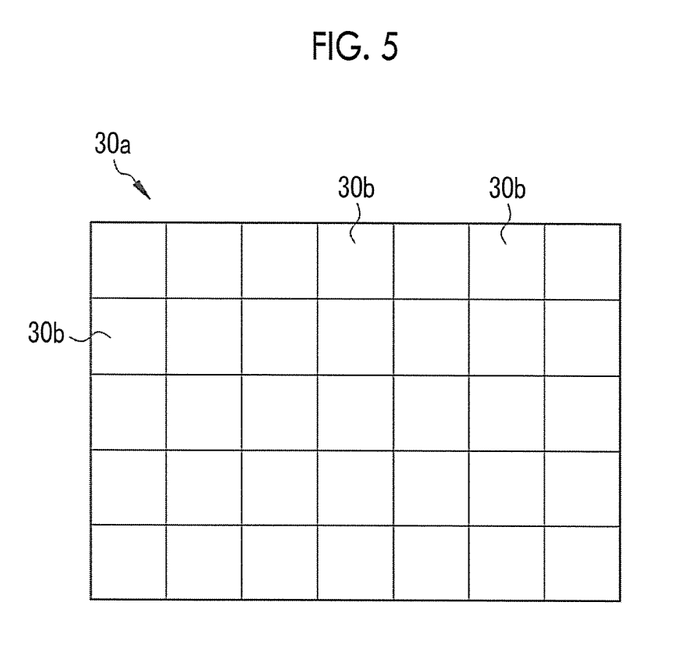
FIG. 5 is a view showing a plurality of blocks that are set in an imaging region.

The main control unit 33 acquires information about a distance to each subject in the imaging region (the angle of view) of the imaging element 30, in order to determine whether or not optically blurred images are present in regions (the background and the foreground) other than a major subject (principal object). Specifically, the main control unit 33 divides an imaging region 30a into a plurality of blocks 30b as shown in FIG. 5, and makes the focus position detecting unit 38 detect a focus position of each block 30b. The blocks 30b correspond to focus detection regions described in claims.

Specifically, the main control unit 33 moves the focus lens 20 to each of the focusing evaluation positions by the search interval $S_D$ in a state in which the APD filter 22 is disposed at a second position where the APD filter 22 is retreated from the optical axis LA. The focus position detecting unit 38 acquires a focusing evaluation value for each block 30b at each focusing evaluation position.

The main control unit 33 detects a focus position of each block 30b by obtaining a focusing evaluation position where the focusing evaluation value is largest. Further, the main control unit 33 converts the detected focus position of each block 30b to a subject distance. The main control unit 33 and the focus position detecting unit 38 acquire information about a distance to a subject in each focus detection region in this way, and function as a distance-information acquisition unit.

In a case in which the main control unit 33 and the focus position detecting unit 38 function as the distance-information acquisition unit and acquire information about a distance to a subject in this way, it is preferable to improve the accuracy of detection of each subject distance by satisfying "n=1" to set the search interval $S_D$. "n=1" is a condition in which the moving distance of an image plane depending on the movement of the focus lens 20 corresponds to the depth D of focus.

Further, one of the plurality of blocks 30b of the imaging region 30a is set as the AF area by the operation of the operation unit 13. The main control unit 33 specifies a subject distance, which is based on the focus position of the block 30b set as the AF area, as information about a distance to a major subject (a major subject distance).

The depth-of-field calculating unit 39 calculates the depth of field DOF in a case in which the APD filter 22 is disposed at a first position where the APD filter 22 is inserted onto the optical axis LA and focuses on a major subject. Specifically, the depth-of-field calculating unit 39 calculates a depth-of-field front end distance $D_N$ and a depth-of-field rear end distance $D_F$ shown in FIG. 6 on the basis of Equation (4) and Equation (5).

$$D_N = \frac{d(H-f)}{H+d-2f} \quad \text{[Equation 4]}$$

$$D_F = \frac{d(H-f)}{H-d} \quad \text{[Equation 5]}$$

Here, d denotes the major subject distance that is obtained by the main control unit 33. f denotes the focal distance of the focus lens 20. Further, H denotes a hyperfocal distance. The hyperfocal distance H is calculated on the basis of Equation (6).

$$H = \frac{f^2}{T\delta} \quad \text{[Equation 6]}$$

Figure 4:
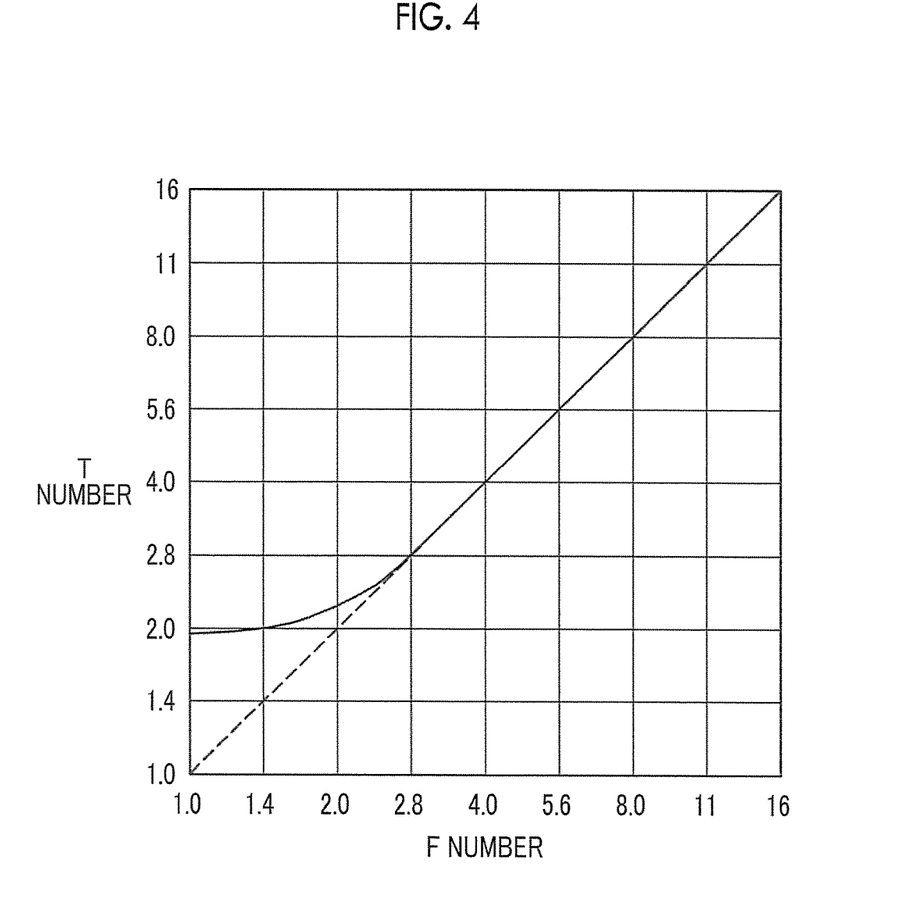
FIG. 4 is a graph showing a correction curve that corrects an F number to a T number.

Here, T denotes a T number obtained from the correction of the F number that is performed using the correction curve shown in FIG. 4, and depends on the optical characteristics of the APD filter 22. The T number corresponds to an imaging diaphragm value that is set on the diaphragm 21 during imaging.

Figure 6:
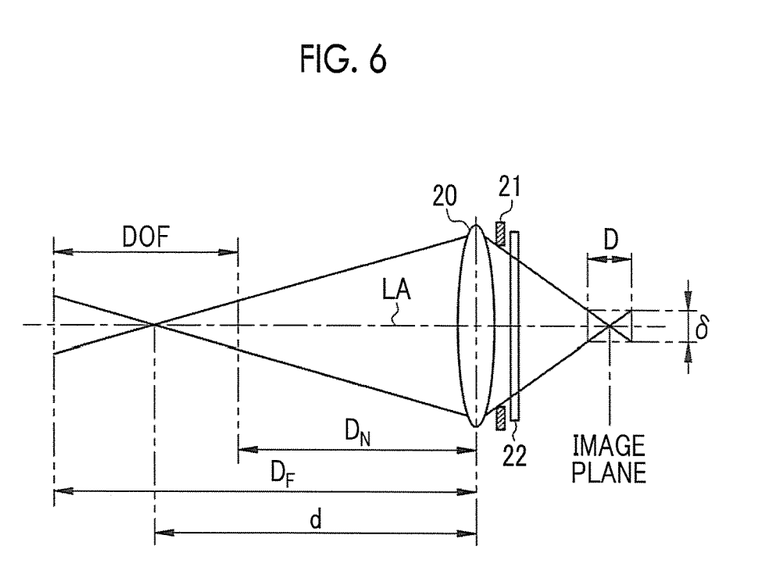
FIG. 6 is a diagram illustrating the depth of field.

A range to the depth-of-field rear end distance $D_F$ from the depth-of-field front end distance $D_N$ calculated in this way is the depth of field DOF. As described above, the depth of field DOF is a value that depends on the optical characteristics of the APD filter 22. Further, the depth of field DOF in a case in which the APD filter 22 is disposed at the first position where the APD filter 22 is inserted onto the optical axis LA is larger than that in a case in which the APD filter 22 is disposed at the second position where the APD filter 22 is retreated from the optical axis LA.

Furthermore, the main control unit 33 is provided with an insertion/retreat control unit 40 that inserts/retreats the APD filter 22 onto/from the optical axis LA. The insertion/retreat control unit 40 determines whether or not a subject other than a major subject is present outside the depth of field DOF on the basis of the subject distance that is calculated for each block 30b by the main control unit 33 and the depth of field DOF that is calculated by the depth-of-field calculating unit 39. Further, the insertion/retreat control unit 40 disposes the APD filter 22 at the first position by controlling the third motor 25 in a case in which the subject other than the major subject is present outside the depth of field DOF. In contrast, the insertion/retreat control unit 40 disposes the APD filter 22 at the second position by controlling the third motor 25 in a case in which the subject other than the major subject is not present outside the depth of field DOF.

Figure 7:
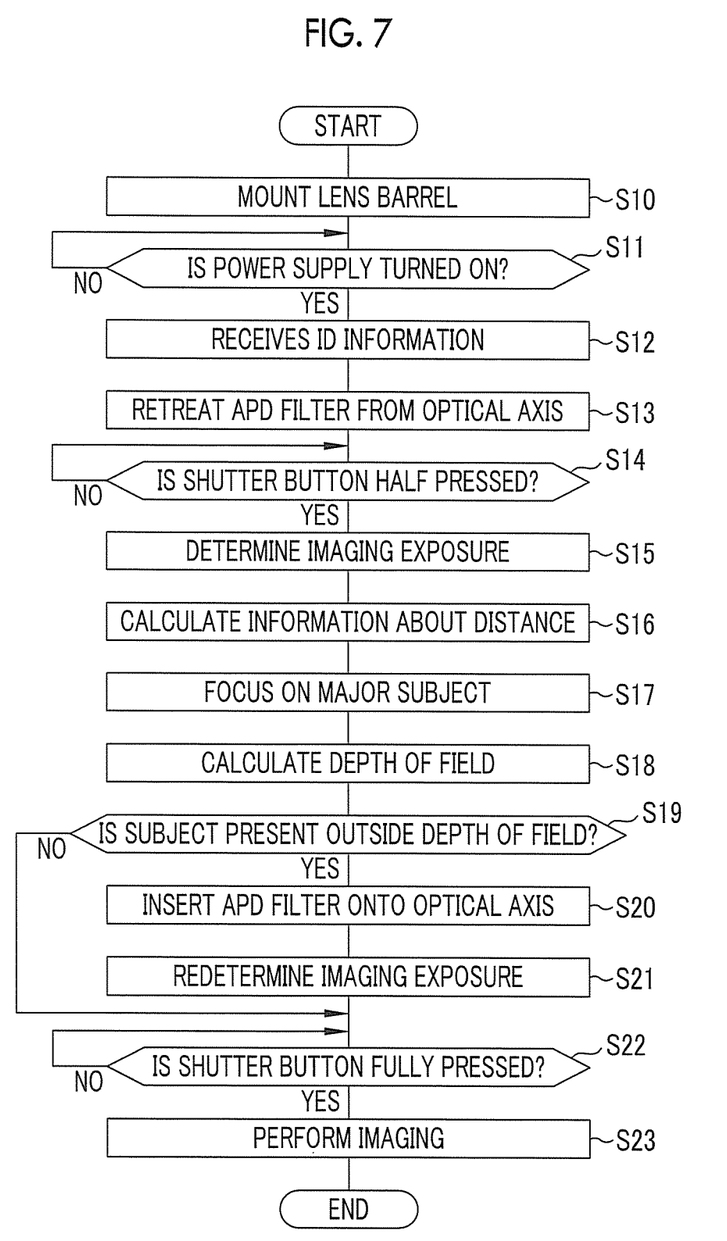
FIG. 7 is a flow chart illustrating the action of the imaging device.

Next, the action of the imaging device 10 will be described with reference to a flow chart shown in FIG. 7. The lens barrel 12 is mounted on the imaging device body 11 (Step S10). Assuming that the power button 13A is operated so that the power supply is turned on (the determination of YES in Step S11), the main control unit 33 of the imaging device body 11 receives ID information from the ID information storage unit 26 provided in the lens barrel 12 and acquires information that is used to specify the focal distance f and the image plane movement coefficient k of the focus lens 20 and the optical characteristics of the APD filter 22 (Step S12).

After that, under the imaging mode, the main control unit 33 disposes the APD filter 22 at the second position where the APD filter 22 is retreated from the optical axis LA (Step S13) and waits for the operation of the shutter button 13D (Step S14). Assuming that the shutter button 13D is half pressed (the determination of YES in Step S14), an operation for determining an imaging exposure is performed (Step S15).

In the operation for determining an imaging exposure, the imaging element 30 acquires an imaging signal by performing an imaging operation, the photometric unit 36 calculates a photometric value on the basis of the imaging signal, and the imaging exposure determining unit 37 determines an imaging exposure (an imaging diaphragm value and an imaging shutter speed) on the basis of the photometric value. The determined imaging diaphragm value and the determined imaging shutter speed are set on the diaphragm 21 and the imaging element 30, respectively.

An operation for detecting a focus position is performed for each block 30b of the imaging region 30a on the basis of the setting of an exposure by the main control unit 33 and the focus position detecting unit 38, so that a subject distance is calculated for each block 30b (Step S16). One of the plurality of blocks 30b of the imaging region 30a is set as the AF area (a major subject region) by the operation of the operation unit 13. As described above, the operation unit 13 functions as a region selection unit that selects one from the plurality of focus detection regions.

A distance to the subject (a major subject or principal object) of the block 30b, which is set as the AF area, is specified as the major subject distance d. After that, the main control unit 33 moves the focus lens 20 to the focus position of the block 30b that is set as the AF area (Step S17). That is, focusing is performed on the major subject.

Next, the depth-of-field front end distance $D_N$ and the depth-of-field rear end distance $D_F$ are obtained using the above-mentioned Equations (4) to (6) by the depth-of-field calculating unit 39, and the depth of field DOF for the major subject is calculated (Step S18). Here, a T number is used as a diaphragm value that is one parameter used to obtain the depth of field DOF. The T number is obtained by correcting an F number, which is set as an imaging diaphragm value, using the correction curve shown in FIG. 4. That is, the depth of field DOF, which is calculated by the depth-of-field calculating unit 39, is the depth of field in a case in which the APD filter 22 is inserted onto the optical axis LA.

Then, the insertion/retreat control unit 40 determines whether or not a subject other than a major subject is present outside the depth of field DOF on the basis of the information about a distance and the depth of field DOF (Step S19). In a case in which the subject other than the major subject is present outside the depth of field DOF (the determination of YES in Step S19), the APD filter 22 is disposed at the first position on the optical axis LA (Step S20).

After that, an imaging exposure is redetermined (Step S21). Specifically, while the setting of the current imaging exposure is maintained, an imaging operation is performed by the imaging element 30 and a photometric value is acquired by the photometric unit 36. Then, an exposure value is obtained on the basis of the photometric value by the imaging exposure determining unit 37, and an imaging shutter speed is determined while an imaging diaphragm value set currently is fixed. The reason for this is that the depth of field is changed in the event that the imaging diaphragm value is changed. The T number is used as the imaging diaphragm value to determine the imaging shutter speed. The determined imaging shutter speed is set on the imaging element 30.

Assuming that the insertion/retreat control unit 40 determines in Step S19 that the subject other than the major subject is not present outside the depth of field DOF (the determination of NO in Step S19), Step S20 and Step S21 are not performed and the setting of an imaging exposure is not changed.

Then, the main control unit 33 waits for an operation for fully pressing the shutter button 13D (Step S22). Assuming that the shutter button 13D is fully pressed (the determination of YES in Step S22), an imaging operation is performed by the imaging element 30 and the photographed image generated by the image processing unit 32 is displayed by the image display unit 34 and is recorded in the memory 35 (Step S23).

As described above, the imaging device 10 inserts the APD filter 22 onto the optical axis LA only in a case in which the subject other than the major subject is present outside the depth of field DOF, that is, a case in which a blurred image is generated. Accordingly, in a case in which the blurred image is not present, the imaging device 10 does not insert the APD filter 22 onto the optical axis LA and does not wastefully reduce the brightness of the photographed image. Further, since the depth of field DOF is calculated using the T number that is obtained in consideration of the optical characteristics of the APD filter 22, the presence or absence of a blurred image is accurately determined.

An imaging exposure is determined depending on a diaphragm value and a shutter speed in the embodiment, but may be determined using the sensitivity of the imaging element 30 in addition to a diaphragm value and a shutter speed. Particularly, in Step S21 of redetermining an imaging exposure, the sensitivity of the imaging element 30 may be determined instead of an imaging shutter speed.

Further, in the embodiment, one of the plurality of focus detection regions is selected as the AF area (the major subject region) by the operation unit 13. However, a region, which is automatically detected by the detection of a face or the like, may be used as the AF area.

Furthermore, the insertion/retreat of the APD filter 22 onto/from the optical axis LA is performed by the movement of the APD filter 22 in the embodiment, but an APD filter, which is described in JP2012-128151A and has a variable shape, may be used instead of the APD filter 22 and the insertion/retreat of the APD filter may be performed by electrical control. Two kinds of materials having different indices of refraction are provided through an interface at which the shape is variable (variable shape interface), so that this APD filter is formed. The shape of the variable shape interface can be electrically changed.

A lens barrel-interchangeable imaging device has been described by way of example in the embodiment, but the invention can also be applied to not a lens-interchangeable imaging device but an integrated imaging device, a mobile phone with a camera, and a smartphone.

EXPLANATION OF REFERENCES

10: imaging device
11: imaging device body
11A: lens barrel mounting portion
12: lens barrel
12A: base end portion
20: focus lens
22: apodization filter
30: imaging element
30a: imaging region

What is claimed is:

1. An imaging device comprising:
an imaging element that photoelectrically converts an incident ray emitted from an imaging region and outputs an imaging signal;
a focus lens that is provided so as to be movable along a light path of the incident ray;
a diaphragm that is provided on the light path;
an apodization filter that is inserted/retreated onto/from the light path;
a distance-information acquisition unit that acquires information about a distance to a subject in each focus detection region by setting a plurality of focus detection regions in the imaging region in a state in which the apodization filter is retreated from the light path and performing focus detection on the basis of the imaging signal while moving the focus lens;
a depth-of-field calculating unit that calculates the depth of field for one major subject on the basis of the information about a distance to the major subject, which is selected from the plurality of subjects, and a diaphragm value of the diaphragm that is corrected on the basis of optical characteristics of the apodization filter; and
an insertion/retreat control unit that determines whether or not a subject other than the major subject is present outside the depth of field on the basis of the information about the distance and inserts the apodization filter onto the light path in a case in which the subject other than the major subject is present outside the depth of field.

2. The imaging device according to claim 1, wherein the depth-of-field calculating unit calculates the depth of field on the basis of the information about the distance to the major subject, the corrected diaphragm value, a focal distance of the focus lens, and a diameter of permissible circle of confusion determined depending on characteristics of the imaging element.

3. The imaging device according to claim 1, further comprising:
a region selection unit that selects one of the focus detection regions from the plurality of focus detection regions, wherein a subject, which is present in the focus detection region selected by the region selection unit, is selected as the major subject.

4. The imaging device according to claim 1, wherein the focus detection is performed by moving the focus lens at each search interval that is determined on the basis of a depth of focus depending on the diaphragm value not yet corrected and calculating a focusing evaluation value for each search interval on the basis of the imaging signal to detect focus position.

5. The imaging device according to claim 4, wherein the depth of focus depends on the diaphragm value, which is not yet corrected, and the diameter of permissible circle of confusion that is determined depending on the characteristics of the imaging element.

6. The imaging device according to claim 4, wherein the search interval is determined on the basis of a condition in which the moving distance of an image plane depending on the movement of the focus lens corresponds to the depth of focus.

7. The imaging device according to claim 1, further comprising:
 a photometric unit that acquires a photometric value by performing photometry on the basis of the imaging signal; and
 an imaging exposure determining unit that determines an imaging shutter speed from an exposure value calculated on the basis of the photometric value and the diaphragm value.

8. An imaging device body comprising:
 a lens barrel mounting portion on which a lens barrel including a focus lens and a diaphragm disposed on a light path and an apodization filter to be inserted/retreated onto/from the light path is detachably mounted;
 an imaging element that photoelectrically converts an incident ray emitted from an imaging region of the lens barrel and outputs an imaging signal;
 a distance-information acquisition unit that acquires information about a distance to a subject in each focus detection region by setting a plurality of focus detection regions in the imaging region in a state in which the apodization filter is retreated from the light path and performing focus detection on the basis of the imaging signal while moving the focus lens;
 a depth-of-field calculating unit that calculates the depth of field for one major subject on the basis of the information about a distance to the major subject, which is selected from the plurality of subjects, and a diaphragm value of the diaphragm that is corrected on the basis of optical characteristics of the apodization filter; and
 an insertion/retreat control unit that determines whether or not a subject other than the major subject is present outside the depth of field on the basis of the information about the distance and inserts the apodization filter onto the light path in a case in which the subject other than the major subject is present outside the depth of field.

9. A lens barrel that is detachably mounted on the imaging device body according to claim 8, the lens barrel comprising:
 a focus lens that is provided so as to be movable along a light path of the incident ray;
 a diaphragm that is provided on the light path;
 an apodization filter that is inserted/retreated onto/from the light path; and
 a base end portion that is detachably mounted on the imaging device body.

* * * * *